Sept. 29, 1953  R. J. BRECKHEIMER  2,653,676
AIR FILTER
Filed May 16, 1951

INVENTOR
RAYMOND J. BRECKHEIMER

BY

ATTORNEYS

Patented Sept. 29, 1953

2,653,676

UNITED STATES PATENT OFFICE 2,653,676

AIR FILTER

Raymond J. Breckheimer, Milwaukee, Wis., assignor to Air Filter Corporation, Milwaukee, Wis., a corporation Application May 16, 1951, Serial No. 226,594

2 Claims. (Cl. 183—69)

This invention appertains to filters of the type employed for filtering dust and other fine particles from an air or other fluid stream, and more particularly to an air filter panel for use in air conditioning units and the like.

One of the primary objects of my invention, is to provide an air filter panel embodying a plurality of screens on which the dust or other particles are collected, with the screens constructed in a novel manner so that the flow of air through the panel will be interrupted and baffled to insure a large area of screen contact, without causing any appreciable air pressure drop, even after the filter panel becomes loaded with dust.

Another salient object of my invention, is to provide an air filter panel which can be readily cleaned and renewed for further use.

A further important object of my invention is the provision of layers of crimped or corrugated screens separated by flat screens to provide a plurality of air channels, the crimps or corrugations being of a novel form and arrangement to provide abrupt filtering walls in the air channels, said walls forming dividers when loaded with dust particles to direct and divide the air in one channel into other separate channels and filtering streams.

A still further important object of my invention is the provision of novel screens, embodying rows of crimps at an angle to lines normal to the face of the filter panel, the crests of one row of crimps lying at the inner ends of the valleys of the other row of crimps to form abrupt divider and filtering walls at the inner ends of the crimps.

With these and other objects in view, the invention consists in the novel construction, arrangement and formation of parts, as will be hereinafter more specifically described and claimed, and illustrated in the accompanying drawing, in which drawing, Figure 1, is a front elevational view of a filtering panel constructed in accordance with my invention, parts of the panel frame being shown broken away and in section.

Figure 1:
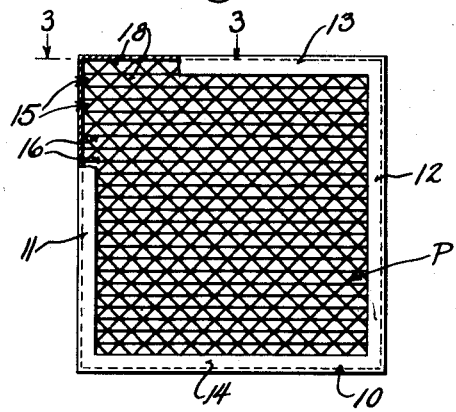

Referring to the drawing in detail, wherein similar reference characters designate corresponding parts throughout the several views, the letter P generally indicates my filtering panel, and the same includes a rectangular frame 10, preferably formed from upright end channel pieces 11 and 12, and top and bottom channel pieces 13 and 14. This forms a channel like frame for receiving and enclosing the ends of the screening elements of the panel.

The screening elements of the panel include corrugated or crimped screens 15 and flat screens 16. These elements 15 and 16 are preferably, but not necessarily, formed from wire mesh coated with a viscous substance, such as oil.

Each filtering element or screen 15 is corrugated or crimped in a novel fashion, to provide rows of crimps or corrugations 17 and 18. The corrugations or crimps of the rows 17 and 18 extend inwardly toward the longitudinal center line of the screen 15 at an angle to the transverse center of the filtering panel, and hence at an angle to the normal path of air flowing through a panel. The corrugations of one row are out of alignment with the corrugations of the next row and hence the crests of the corrugations or crimps of one row lie between the crests of the corrugations of the other row. This forms abrupt filtering and dividing walls 19 at the inner ends of the crests of the corrugations of the rows 17 and 18. The abrupt filtering and dividing walls 19 of one row are disposed at the inner ends of the valleys of the next row.

Figure 2:
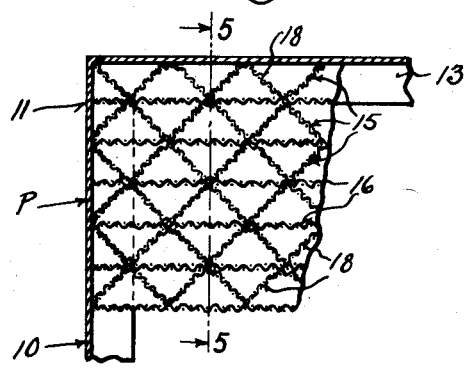
Figure 2, is a detail fragmentary vertical sectional view through one corner of the filtering panel, the view being on a larger scale than Figure 1, and taken substantially on the line 2—2 of Figure 3, looking in the direction of the arrows.
Figure 3:
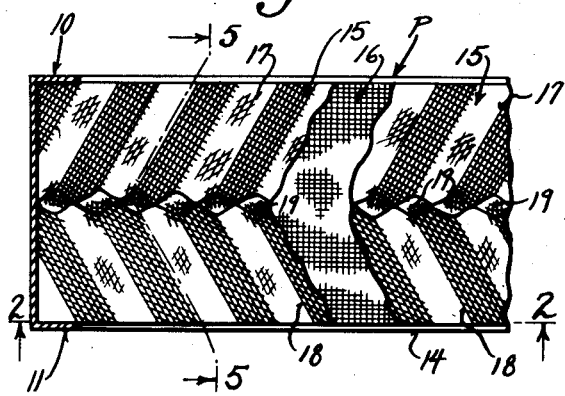
Figure 3, is a fragmentary horizontal sectional view through the panel, taken on the line 3—3 of Figure 1, looking in the direction of the arrows.
Figure 4:
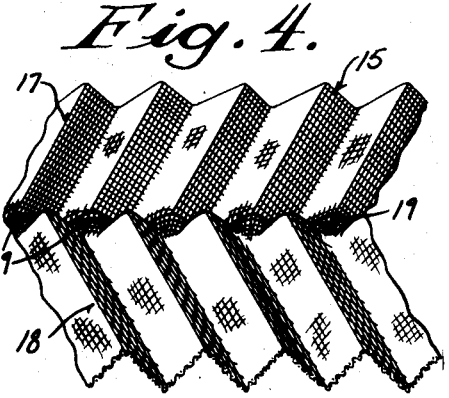
Figure 4, is an enlarged fragmentary detail perspective view showing a pair of the crimped screens constructed in accordance with this invention, separated by a flat screen sheet.
Figure 5:
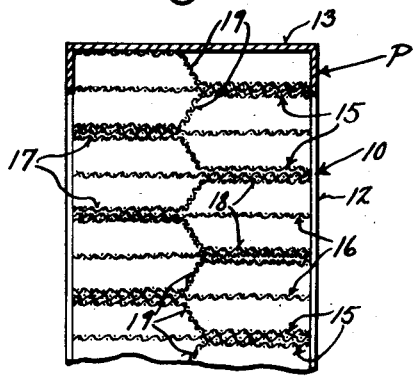
Figure 5, is a fragmentary transverse sectional view through the panel taken on the line 5—5 of Figure 3, looking in the direction of the arrows.

In assembling the filtering panel, a corrugated screen 15 is first placed in position, then a flat screen 16 and then a second corrugated screen 15, and so on, as is clearly shown in Figure 2 of the drawing. Hence, there is a vertical stack of screens with the corrugated screens 15 and the flat screens 16 alternating.

In actual practice, the air flowing through a panel constructed in accordance with this invention, enters through a plurality of channels or valleys and through the wire mesh of the screens, and the dust particles impinge on the oiled surface of the screens. As the screens become loaded with dust particles, the air separates into the channels or valleys defined by the crests of the corrugations and it is to be noted that the air flowing through a channel or valley between two crests of a row of corrugations of a filtering screen, will strike an abrupt wall 19, and the air will be divided into two separate streams flowing into adjacent valleys or channels in the other row of corrugations on each side of the crests. Hence, the air is broken up, baffled and divided and the air stream will take circuitous passages through the filter, exposing the air to large screen area for insuring the proper filtering of the air.

Due to the arrangement of the corrugations, the air is permitted to flow freely through the channels, even after the screens become loaded with dust. The arrangement of the channels is such that the screens can be readily cleaned and washed and thereafter recoated with oil.

Changes in details may be made without departing from the spirit or the scope of this invention, but what I claim as new is:

1. An air filtering panel comprising crimped mesh filtering members, each of said members including at least one row of corrugations arranged at an angle to lines normal to the face of the panel and a second row of corrugations having their inner ends out of coincidence with the inner ends of the corrugations of the first row and with the crests of the second row of corrugations lying between the crests of the first row of corrugations.

2. An air filtering panel comprising crimped mesh filtering members, each of said members including at least one row of corrugations arranged at an angle to lines normal to the face of the panel and a second row of corrugations having their inner ends out of coincidence with the inner ends of the corrugations of the first row and with the crests of the second row of corrugations lying between the crests of the first row of corrugations and abrupt walls at the inner ends of the second row of corrugations lying across the valleys of the first row of corrugations.

RAYMOND J. BRECKHEIMER.

References Cited in the file of this patent

UNITED STATES PATENTS

| Number | Name | Date |
|---|---|---|
| 2,079,297 | Manning | May 4, 1937 |
| 2,274,684 | Goodloe | Mar. 3, 1942 |
| 2,286,479 | Farr | June 16, 1942 |
| 2,394,208 | Schaaf | Feb. 5, 1946 |
| 2,486,728 | Asad | Nov. 1, 1949 |
| 2,555,125 | Gregory | May 29, 1951 |